United States Patent
May

(10) Patent No.: US 6,404,172 B1
(45) Date of Patent: Jun. 11, 2002

(54) METHOD AND APPARATUS FOR PROVIDING INTEGRATED BUCK OR BOOST CONVERSION

(75) Inventor: Marcus W. May, Austin, TX (US)

(73) Assignee: Sigmatel, Inc., Austin, TX (US)

(*) Notice: Subject to any disclaimer, the term of this patent is extended or adjusted under 35 U.S.C. 154(b) by 0 days.

(21) Appl. No.: 09/716,895

(22) Filed: Nov. 20, 2000

(51) Int. Cl.[7] .............................. G05F 1/40; H02M 7/00
(52) U.S. Cl. ........................................ 323/268; 363/101
(58) Field of Search .............................. 323/266, 268, 323/270, 271, 273, 275, 282; 363/17, 98, 132, 101

(56) References Cited

U.S. PATENT DOCUMENTS

| | | | |
|---|---|---|---|
| 4,347,474 A | | 8/1982 | Brooks et al. |
| 5,245,520 A | | 9/1993 | Imbertson |
| 5,402,060 A | * | 3/1995 | Erisman ..................... 323/268 |
| 5,500,579 A | | 3/1996 | Kim et al. |
| 5,615,101 A | * | 3/1997 | Moriarty ..................... 363/101 |
| 5,714,863 A | | 2/1998 | Hwang et al. |
| 5,814,976 A | | 9/1998 | Allison |
| 5,894,243 A | | 4/1999 | Hwang |
| 5,949,224 A | * | 9/1999 | Barkaro ..................... 323/282 |
| 6,018,469 A | * | 1/2000 | Poon ............................ 363/20 |

* cited by examiner

*Primary Examiner*—Matthew Nguyen
(74) *Attorney, Agent, or Firm*—Timothy W. Markison

(57) ABSTRACT

A method and apparatus for integrating buck or boost converting includes processing for controlling the configuration of transistors, an inductor, a power source, and a load to provide buck or boost converting. Such processing begins by determining whether a buck/boost signal is indicating buck operation or boost operation. If the buck/boost signal is indicating buck operation, the processing proceeds by generating a buck control signal and a load control signal. The buck control signal is provided to the transistors such that the transistors are coupled to a power source and the inductor to provide a buck converter. The load control signal is provided to a load transistor to regulate the output with respect to the load. When the buck/boost signal indicates boost operation, the processing generates a boost control signal and a load control signal. The boost control signal is provided to the transistors such that the transistors are coupled to the power source and the inductor to provide a boost converter. The load control signal is provided to the load transistor to regulate the output of the external load.

16 Claims, 3 Drawing Sheets

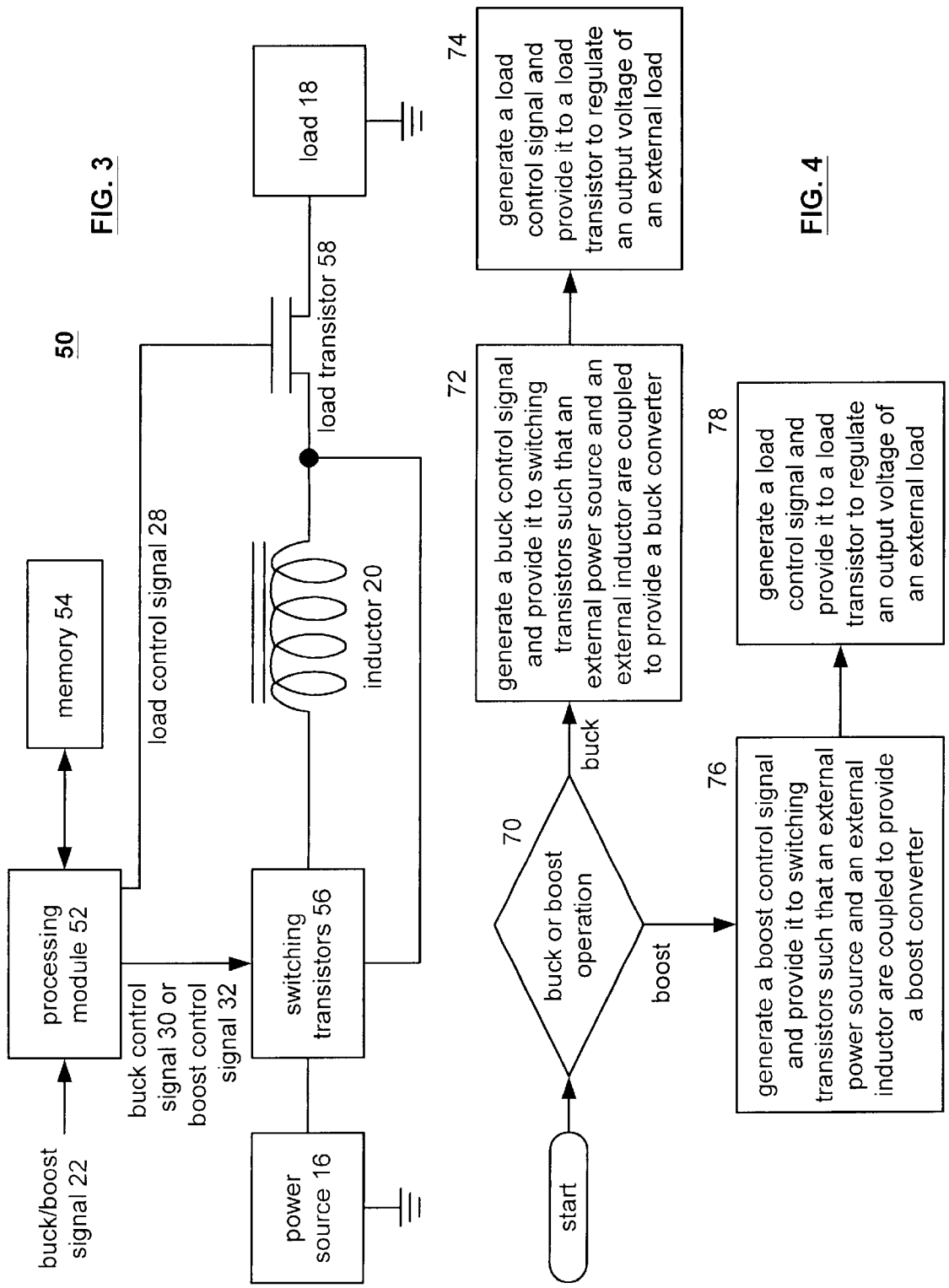

METHOD AND APPARATUS FOR PROVIDING INTEGRATED BUCK OR BOOST CONVERSION

TECHNICAL FIELD OF THE INVENTION

This invention relates generally to power supplies and more particularly to an integrated buck or boost converter.

BACKGROUND OF THE INVENTION

Power supplies are known to take one voltage level and convert it to one or more different voltage levels and may be designed using a variety of topologies. For example, a power supply may be a switchboard power supply or ferroresonance power supply. A switch mode power supply may be implemented using one of many switch-mode topologies. For example, a switch-mode power supply may be implemented as a buck converter, a boost converter, a half-bridge converter, or a full bridge converter.

Typically, if a switch-mode power supply is needed to provide a substantially amount of power (e.g. greater than 100 watts), the power supply will include a full bridge or a half-bridge converter. If a switch-mode power supply is needed for lower power applications, it will include a buck or boost converter. Generally, a buck converter produces an output voltage that is less than the input voltage while a boost converter produces an output voltage that is greater than the input voltage. Thus, in low power applications such as portable electronic devices, a buck or boost converter is generally utilized depending on the voltage of the power source and the voltage needed to power the circuitry of the portable electronic device.

For example, a portable electronic device may be designed to be powered from a lithium battery that produces a supply between 4.2 volts and 3.0 volts while CMOS integrated circuits in the device requiring a supply of 1.8 volts to 2.5 volts. In this example, a buck converter would be utilized to step down the battery voltage to a controlled 1.8 or 2.5 volts. If, however, the same portable electronic device were designed to be powered from a 1½ volt battery, the device would include a boost converter to step up the 1½ volts to 1.8 or 2.5 volts. Clearly, the selection of a power source and the selection of circuitry are made by the designer of the portable electronic device. Therefore, the manufacturing of the integrated circuits should support either choice of the designer of the device can make to power the system.

To minimize the impact of multiple system level designs, many manufacturers implement both a buck and boost converter associated with the same circuitry to provide for flexibility in the choice of power sources. While this technique reduces the complexity of managing multiple system level designs since one design may be used in multiple applications, it requires additional circuitry. As is commonly known, additional circuitry increases the cost to produce a device.

Therefore, a need exists for a single solution that can provide the flexibility to implement either a buck or a boost converter in multiple applications and minimizes the need for additional circuitry.

BRIEF DESCRIPTION OF THE DRAWINGS

FIG. 3 illustrates another embodiment of an integrated buck or boost converter in accordance with the present invention; and FIG. 4 illustrates a logic diagram of a method for integrating buck or boost converting in accordance with the present invention.

DETAILED DESCRIPTION OF A PREFERRED EMBODIMENT

Generally, the present invention provides a method and apparatus for integrating buck or boost converting. Such a method and apparatus includes processing for controlling the configuration of transistors, an inductor, a power source, and a load to provide buck or boost converting. Such processing begins by determining whether a buck/boost signal is indicating buck operation or boost operation. If the buck/boost signal is indicating buck operation, the processing proceeds by generating a buck control signal and a load control signal. The buck control signal is provided to the transistors such that the transistors are coupled to a power source and the inductor to provide a buck converter. The load control signal is provided to a load transistor to regulate the output with respect to the load. When the buck/boost signal indicates boost operation, the processing generates a boost control signal and a load control signal. The boost control signal is provided to the transistors such that the transistors are coupled to the power source and the inductor to provide a boost converter. The load control signal is provided to the load transistor to regulate the output of the external load. With such a method and apparatus, an integrated buck or boost converter may be readily obtained with a minimal additional circuitry, provides the flexibility system level designers need, and may be integrated on an integrated circuit (IC).

Figure 1:
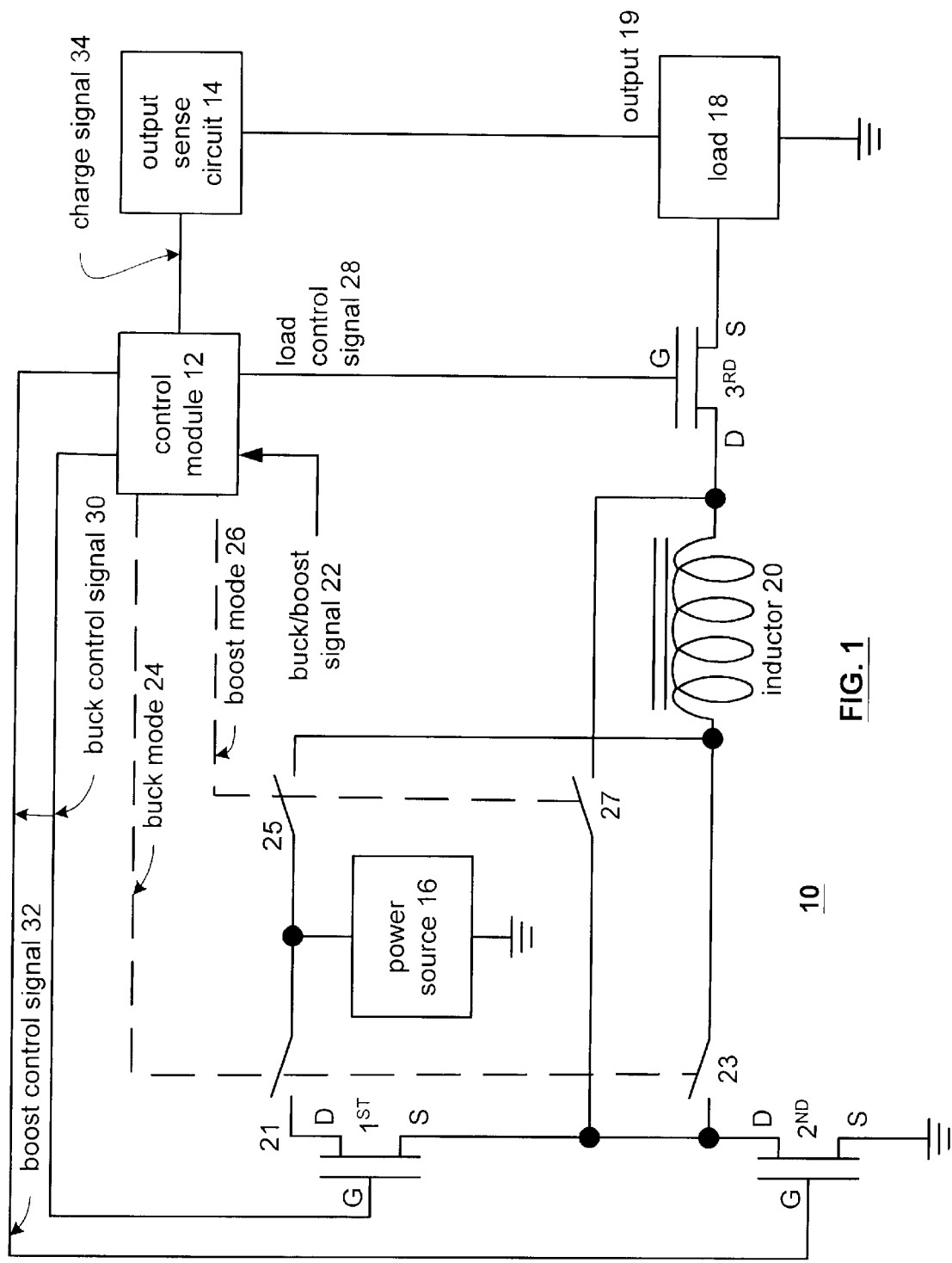
FIG. 1 illustrates a schematic block diagram of an integrated buck or boost converter in accordance with the present invention.

The present invention can be more fully described with reference to FIGS. 1 through 4. FIG. 1 illustrates a schematic block diagram of a buck or boost converter 10 that includes a control module 12, an output sensing circuit 14, and a $1^{st}$ transistor, a $2^{nd}$ transistor, and a $3^{rd}$ transistor. The control module 12, the output sensing circuit 14, the $1^{st}$, $2^{nd}$ and $3^{rd}$ transistors may all be integrated on an integrated circuit with pins connecting to an external power source 16, an external inductor 20 and an external load 18. Switches 21, 23, 25 and 27 may be implemented using transistors to provide the buck or boost coupling between the elements of the buck or boost converter based on control signals provided by the control module. If implemented as transistors, switches 21, 23, 25 and 27 may be integrated on the integrated circuit or one a printed circuit board (PCB). Alternatively, switches 21, 23, 25, and 27 may be jumper wires on a PCB, which are coupled based on the selected operating mode, i.e., buck or boost operation. As one of average skill in the art will appreciate, the buck or boost converter 10 may be implemented utilizing discrete components on a printed circuit board, may be integrated on an integrated circuit with the exception of the power source, or any combination thereof to provide a desired level of integration as determined by the designer of portable electronic devices.

In operation, the control module 12 senses a buck/boost signal 22 to determine the mode of operation for the converter 10. If the buck/boost signal 22 indicates a buck mode 24, the control module 12 causes switches 21 and 23 to be closed and switches 25 and 27 to be open. (Note that if switches 21 and 23 are jumper wires on a printed circuit board, this would be a manual step preformed during the manufacture of the printed circuit board). The control module 12 also generates a buck control signal 30 which is provided to the gates of the $1^{st}$ and $2^{nd}$ transistors. In this configuration, the drain of the $1^{st}$ transistor is coupled to the power source 16, which may be a battery. The common node of the source of the $1^{st}$ transistor and the drain of the $2^{nd}$ transistor is coupled to the inductor 20.

The control module 12 further generates a load control signal 28 that is provided to the gate of the $3^{rd}$ transistor. The drain of the $3^{rd}$ transistor is coupled to the inductor 20 and the source of the $3^{rd}$ transistor is coupled to the load 18, which may be a capacitor, resistor, or any other type of load. The load 18 supports an output voltage 19. The output sensing circuit 14 senses the output voltage or a representation thereof and generates a charge signal 34 that is provided to the control module 12. Based on the charge signal 34, the control module 12 generates the buck control signal 30 and the load control signal 28 to regulate the output voltage 19 to a desired level.

If the buck/boost signal 22 indicates a boost mode 26 of operation, switches 25 and 27 are closed while switches 21 and 23 are open. In this configuration, the $1^{st}$ transistor is unused. By closing switch 27, the drain of the $2^{nd}$ transistor is coupled to the node coupling the inductor 20 to tie drain of the $3^{rd}$ transistor. The power source 16 is coupled to the inductor 20 via switch 25. The control module 12 generates a boost control signal 32 that is provided to the gate of the $2^{nd}$ transistor. The control module 12 also generates the load control signal 28 that is provided to the gate of the $3^{rd}$ transistor. The output sensing circuit 14 senses the output voltage 19 or a representation thereof to produce the charge signal 34. Based on the charge signal 34, the control module 12 generates the boost control signal 32 and the load control signal 28 to regulate the output voltage 19. A further description of the control module 12 and the output sensing circuit 14 may be found in co-pending Patent Application entitled "Method and Apparatus for Regulating a DC Output Voltage", having a filing date of Apr. 18, 2000 and a Ser. No. of 09/551,123. The converter 10 includes a minimal number of additional components to provide buck or boost converting. As such, manufacturers of portable electronic devices are presented with a more integrated and flexible solution for providing buck or boost converting.

Figure 2:
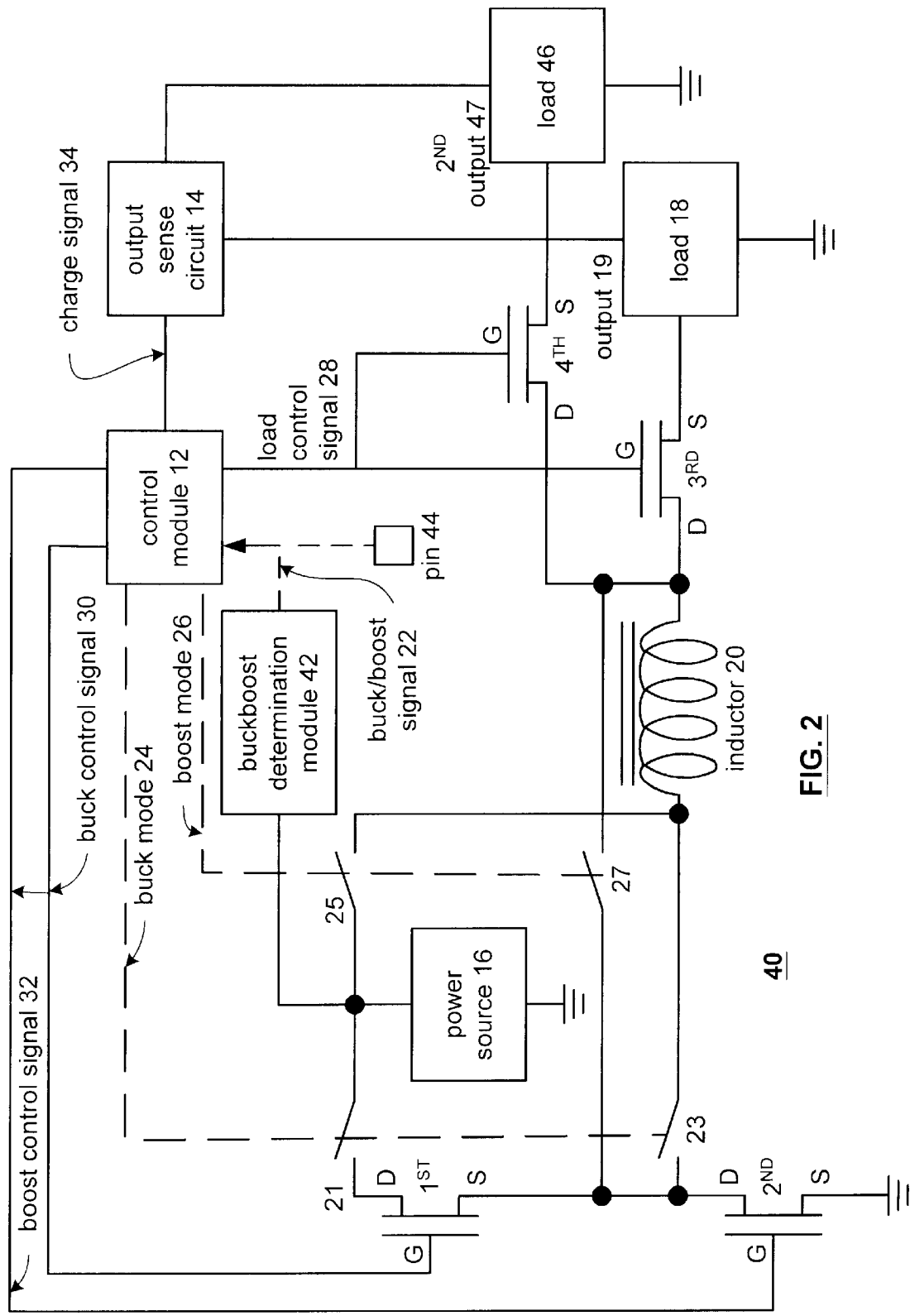
FIG. 2 illustrates an alternate integrated buck or boost converter in accordance with the present invention.

FIG. 2 illustrates an alternate buck or boost converter 40 that includes control module 12, the output sensing circuit 14, the $1^{st}$, 2md, $3^{rd}$ and a $4^{th}$ transistor, a pin 44 or a buck boost determination module 42. These components may be integrated on an integrated circuit and coupled to external devices such as the power source 16, the inductor 20, a $1^{st}$ load 18 and a $2^{nd}$ load 46. In this configuration, the buck/boost signal 22 may be provided via a pin 44. For example, if the pin is held high, a buck operation is selected and when held low a boost operation is selected, or vice versa. Alternatively, a buck/boost determination module 42 may be utilized to sense the voltage of the power source 16. Upon sensing the voltage of the power source 16, the buck/boost determination module 42 may determine whether the converter is to be operated in a buck mode or a boost mode. For example, if the buck determination module 42 senses the power source voltage to be 3 volts, the converter 40 may be operated in a buck mode. Alternatively, if the power source 16 is a 1½ volt battery, the buck/boost signal 22 would be selected for boost configuration. Recall that a buck converter produces an output voltage that is lower than the input voltage and a boost converter produces an output voltage that is greater than the input voltage.

The converter 40 operates in a similar manner as the converter of FIG. 1 with the addition of a second output voltage and various ways to produce the buck/boost signal 22. The additional output via load 46 and the $4^{th}$ transistor allow for the buck/boost converter 40 to produce multiple outputs utilizing a single inductor, a single control module, and a single output sense circuit 14 from a single power source 16. Details of the operation of the control module, the output sensing circuit 14, the $3^{rd}$ and $4^{th}$ transistors coupled to load 18 and load 46 is described in co-pending Patent Application entitled "Method and Apparatus for Regulating a DC Output Voltage", having a filing date of Apr. 18, 2000, and a Ser. No. of 09/551,123.

FIG. 3 illustrates an alternate schematic block diagram of a buck/boost converter 50 that includes a processing module 52, memory 54, the power source 16, switching transistors 56, the inductor 20, a load transistor 58 and a load 18. The processing module 52 may be a single processing device or a plurality of processing devices. Such a processing device may be a microprocessor, microcomputer, microcontroller, digital signal processor, state machine, logic circuitry, and/or any device that manipulates signals (analog or digital) based on operational instructions. The memory 54 may be a single memory device or a plurality of memory devices. Such a memory device may be a random access memory, ready only memory, floppy disk memory, system memory, magnetic tape memory, and/or any device that stores digital information. Note that when the processing module 52 implements one or more of its functions via a state machine or logic circuit, the memory storing the corresponding operational instructions is embedded within the circuitry comprising the state machine or logic circuit. The operational instructions stored in memory 54 and executed by processing module 52 are further described in the logic diagram of FIG. 4.

FIG. 4 illustrates a logic diagram of a method for controlling a buck or boost converter. The process begins at Step 70 where the processing module receives a buck/boost signal and determines whether the converter is to be operated in a buck or boost mode. If the converter is to be operated in a buck mode, the processing module generates a buck control signal and provides it to switching transistors. The switching transistors 56 are coupled in such a manner to the external power source and an external inductor to provide a buck converter. This is done at Step 72. The process then proceeds to Step 74 where the processing module generates a load control signal 28 that is provided to a load transistor 58. The load control signal regulates the output voltage imposed across the external load 18.

If the processing module 52 detects that a boost operation is to be implemented, the process then proceeds to Step 76. At Step 76, a boost control signal is generated and provided to the switching transistors 56. The switching transistors 56 are coupled to the external power source and the external inductor to provide a boost converter. The process then proceeds to Step 78 where a load. control signal is generated and provided to the load transistor 58. The load control signal 28 regulates the output voltage imposed across the external load 18.

The preceding discussion has presented a method and apparatus for a highly integrated buck or boost converter module. With minimal additional circuitry, the present invention provides flexibility to designers of portable electronic devices to select various different types of power sources, i.e. batteries, to source an integrated circuit that includes the present invention. As one of average skill in the art will appreciate, other embodiments may be derived from the teachings of the present invention without deviating from the scope of the claims.

What is claimed is:

1. An integrated buck or boost converter comprises:
a first transistor having a first drain, a first source, and a first gate;
a second transistor having a second drain, a second source, and a second gate, wherein the second source is coupled to a reference potential and wherein the first source is coupled to the second drain;
a third transistor having a third drain, a third source, and a third gate, wherein the third source is coupled to an external load and the third drain is coupled to an external inductor;
an output sensing circuit operably coupled to the external load, wherein the output sensing circuit senses a representation of an output voltage and to produce therefrom a charge signal; and
control module coupled to the first gate, to the second gate, and to the third gate, wherein the control module is operably coupled to receive the charge signal and a buck/boost signal, wherein, when the buck/boost signal indicates buck operation:
the control module generates a buck control signal that is provided to the first and second gates,
the control module generates a load control signal that is provided to the third gate,
the first drain is operably coupled to an external power source, and
the first source is operably coupled to the external inductor;
wherein, when the buck/boost signal indicates boost operation:
the control module generates a boost control signal that is provided to the second gate,
the control module generates the load control signal that is provided to the third gate,
the second drain is operably coupled to a node coupling the external inductor to the third transistor, and
the external inductor is coupled to the external power source.

2. The integrated buck or boost converter of claim 1 further comprises:
a fourth transistor having a fourth drain, a fourth source, and a fourth gate, wherein the fourth source is coupled to a second external load, and the fourth drain is coupled to the external inductor, wherein the control module provides a drive signal to either the third gate or the fourth gate to couple the external inductor to the external load or the second external load, respectively.

3. The integrated buck or boost converter of claim 1 further comprises a pin operable to receive an external hard wire coupling to a first potential or a second potential, wherein the hard wire coupling provides the buck/boost signal.

4. The integrated buck or boost converter of claim 1 further comprises an automatic buck/boost determination module that provides the buck/boost signal in response to determining potential of the external power source.

5. The integrated buck or boost converter of claim 1 further comprises an automatic buck/boost coupling module that automatically couples the integrated buck or boost converter based on the buck/boost signal.

6. A buck or boost converter comprises:
an inductor;
a load;
a first transistor having a first drain, a first source, and a first gate;
a second transistor having a second drain, a second source, and a second gate, wherein the second source is coupled to a reference potential and wherein the first source is coupled to the second drain;
a third transistor having a third drain, a third source, and a third gate, wherein the third source is coupled to the load and the third drain is coupled to the inductor;
an output sensing circuit operably coupled to the load, wherein the output sensing circuit senses a representation of an output voltage and to produce therefrom a charge signal;
a buck switching module;
a boost switching module;
control module is coupled to the first gate, to the second gate, to the third gate, the buck switching module, and the boost switching module, wherein the control module is operably coupled to receive the charge signal and a buck/boost signal, wherein, when the buck/boost signal indicates buck operation:
the control module generates a buck control signal that is provided to the first and second gates,
the control module generates a load control signal that is provided to the third gate,
the first drain is operably coupled to an external power source via the buck switching module, and
the first source is operably coupled to the external inductor via the buck switching module;
wherein, when the buck/boost signal indicates boost operation:
the control module generates a boost control signal that is provided to the second gate,
the control module generates the load control signal that is provided to the third gate,
the second drain is operably coupled to a node coupling the external inductor to the third transistor via the boost switching module, and
the external inductor is coupled to the external power source via the boost switching module.

7. The buck or boost converter of claim 6 further comprises:
a fourth transistor having a fourth drain, a fourth source, and a fourth gate, wherein the fourth source is coupled to a second external load, and the fourth drain is coupled to the external inductor, wherein the control module provides a drive signal to either the third gate or the fourth gate to couple the external inductor to the external load or the second external load, respectively.

8. The buck or boost converter of claim 6 further comprises a pin operable to receive an external hard wire coupling to a first potential or a second potential, wherein the hard wire coupling provides the buck/boost signal.

9. The integrated buck or boost converter of claim 6 further comprises an automatic buck/boost determination module that provides the buck/boost signal in response to determining potential of the external power source.

10. The integrated buck or boost converter of claim 6 further comprises an automatic buck/boost coupling module that automatically couples the integrated buck or boost converter based on the buck/boost signal.

11. A method for providing buck or boost converter, the method comprises the steps of:
determining whether a buck/boost signal is indicating buck operation or boost operation;
when the buck/boost signal is indicating buck operation, generating a buck control signal;
generating a load control signal;

providing the buck control signal to switching transistors such that the switching transistors are coupled to an external power source and an external inductor to provide a buck converter;

providing the load control signal to a load transistor to regulate an output voltage of an external load;

when the buck/boost signal is indicating boost operation, generating a boost control signal;

generating the load control signal;

providing the boost control signal to the switching transistors such that the switching transistors are coupled to the external power source and the external inductor to provide a boost converter; and providing the load control signal to the load transistor to regulate the output voltage of the external load.

12. The method of claim 11 further comprises: providing the load control signal to a second load transistor to regulate a second output voltage of a second external load.

13. The method of claim 11 further comprises automatically generating the buck/boost signal in response to determining potential of the external power source.

14. A buck or boost converter comprises:

an inductor;

a load;

a processing module; and memory operably coupled to the processing module, wherein the memory includes operational instructions that cause the processing module to:

determine whether a buck/boost signal is indicating buck operation or boost operation;

when the buck/boost signal is indicating buck operation, generate a buck control signal;

generate a load control signal;

provide the buck control signal to switching transistors such that the switching transistors are coupled to an external power source and the inductor to provide a buck converter;

provide the load control signal to a load transistor to regulate an output voltage of the load;

when the buck/boost signal is indicating boost operation, generate a boost control signal;

generate the load control signal;

provide the boost control signal to the switching transistors such that the switching transistors are coupled to the external power source and the inductor to provide a boost converter; and provide the load control signal to the load transistor to regulate the output voltage of the load.

15. The buck or boost converter of claim 14, wherein the memory further comprises operational instructions that cause the processing module to:

provide the load control signal to a second load transistor to regulate a second output voltage of a second external load.

16. The buck or boost converter of claim 14, wherein the memory further comprises operational instructions that cause the processing module to automatically generate the buck/boost signal in response to determining potential of the external power source.

* * * * *